United States Patent
Tayama

(10) Patent No.: US 10,302,448 B2
(45) Date of Patent: May 28, 2019

(54) AUTOMOBILE PERIPHERY INFORMATION DISPLAY SYSTEM

(71) Applicants: Shuichi Tayama, Tokyo (JP); IMAGE CO., LTD., Tokyo (JP)

(72) Inventor: Shuichi Tayama, Tokyo (JP)

(73) Assignees: SHUICHI TOYAMA, Tokyo (JP); IMAGE CO., LTD., Tokyo (JP)

( * ) Notice: Subject to any disclaimer, the term of this patent is extended or adjusted under 35 U.S.C. 154(b) by 7 days.

(21) Appl. No.: 15/574,715

(22) PCT Filed: May 13, 2016

(86) PCT No.: PCT/JP2016/064331
§ 371 (c)(1),
(2) Date: Nov. 16, 2017

(87) PCT Pub. No.: WO2016/186039
PCT Pub. Date: Nov. 24, 2016

(65) Prior Publication Data
US 2018/0149491 A1    May 31, 2018

(30) Foreign Application Priority Data
May 20, 2015   (JP) .................................. 2015-102831

(51) Int. Cl.
*G01C 21/00*       (2006.01)
*G01C 21/36*       (2006.01)
(Continued)

(52) U.S. Cl.
CPC .......... *G01C 21/3694* (2013.01); *B60R 21/00* (2013.01); *G01C 21/3697* (2013.01);
(Continued)

(58) Field of Classification Search
None
See application file for complete search history.

(56) References Cited

U.S. PATENT DOCUMENTS 7,733,244 B2 *  6/2010  Asada ................ G01C 21/3647
                                           340/995.1
7,751,945 B2 *  7/2010  Obata .................... G08G 1/161
                                             340/902
(Continued)

FOREIGN PATENT DOCUMENTS

JP      2001-042026 A      2/2001
JP      2001-099666 A      4/2001
(Continued)

OTHER PUBLICATIONS

PCT/ISA/210, "International Search Report for International Application No. PCT/JP2016/064331" dated May 13, 2016.

*Primary Examiner* — Jonathan M Dager
(74) *Attorney, Agent, or Firm* — Manabu Kanesaka

(57) ABSTRACT

An automobile periphery information display system can display actual situations around an own vehicle as superimposing on a map, and detects situations around the own vehicle with a sensor device. A navigation device specifies a current position and a travel direction of the own vehicle and reads map data of a peripheral region including the current position from a map database. An object determination unit detects existence of a detection object based on sensor information detected by the sensor device and determines a category of the detection object. Meanwhile, a position detection unit obtains positional information of the detection object based on the sensor information with the own vehicle being as a reference. An image generation unit generates a map image in which an icon corresponding to the detection object is superimposed on the map data at a position indicated by the positional information detected by the object determination unit.

9 Claims, 8 Drawing Sheets

(51) Int. Cl.
   B60R 21/00     (2006.01)
   G08G 1/09      (2006.01)
   G08G 1/0969    (2006.01)
   G08G 1/16      (2006.01)
   G09B 29/10     (2006.01)
   H04W 4/46      (2018.01)
   G06K 9/00      (2006.01)
   G06T 11/60     (2006.01)
   H04N 13/204    (2018.01)

(52) U.S. Cl.
   CPC ..... G06K 9/00798 (2013.01); G06K 9/00805 (2013.01); G06T 11/60 (2013.01); G08G 1/09 (2013.01); G08G 1/0969 (2013.01); G08G 1/16 (2013.01); G08G 1/163 (2013.01); G08G 1/165 (2013.01); G08G 1/166 (2013.01); G09B 29/10 (2013.01); H04W 4/46 (2018.02); H04N 13/204 (2018.05)

(56) References Cited

U.S. PATENT DOCUMENTS

| | | | | |
|---|---|---|---|---|
| 7,840,331 B2* | 11/2010 | Yoshioka | ............... | G08G 1/164 340/995.13 |
| 9,280,919 B2* | 3/2016 | Johnson | .................. | G06T 13/40 |
| 9,470,543 B2* | 10/2016 | Arita | .................... | G09B 29/106 |
| 9,571,539 B2* | 2/2017 | Sawato | ............... | G06F 3/04817 |
| 9,726,514 B2* | 8/2017 | Pudiyathanda | .... | G01C 21/3667 |
| 10,002,462 B2* | 6/2018 | Seo | ........................ | G08G 1/166 |
| 2005/0088318 A1* | 4/2005 | Liu | ........................ | G08G 1/0965 340/902 |
| 2005/0225457 A1* | 10/2005 | Kagawa | ............... | G08G 1/0965 340/995.13 |
| 2007/0229310 A1* | 10/2007 | Sato | ........................ | B60W 50/14 340/995.1 |
| 2008/0154499 A1* | 6/2008 | Tanaka | .................. | G01C 21/362 701/431 |
| 2009/0024317 A1* | 1/2009 | Aase | ........................ | G01C 21/00 701/533 |
| 2015/0120188 A1* | 4/2015 | Jung | ........................ | G08G 1/20 701/468 |
| 2015/0256506 A1* | 9/2015 | Sawato | .................. | H04L 51/38 715/758 |
| 2017/0132480 A1* | 5/2017 | Han | ........................ | G06T 3/0062 |
| 2018/0225963 A1* | 8/2018 | Kobayashi | ........... | G08G 1/0965 |

FOREIGN PATENT DOCUMENTS

| | | |
|---|---|---|
| JP | 2005-215964 A | 8/2005 |
| JP | 2008-046947 A | 2/2008 |
| JP | 2009-223845 A | 10/2009 |

\* cited by examiner

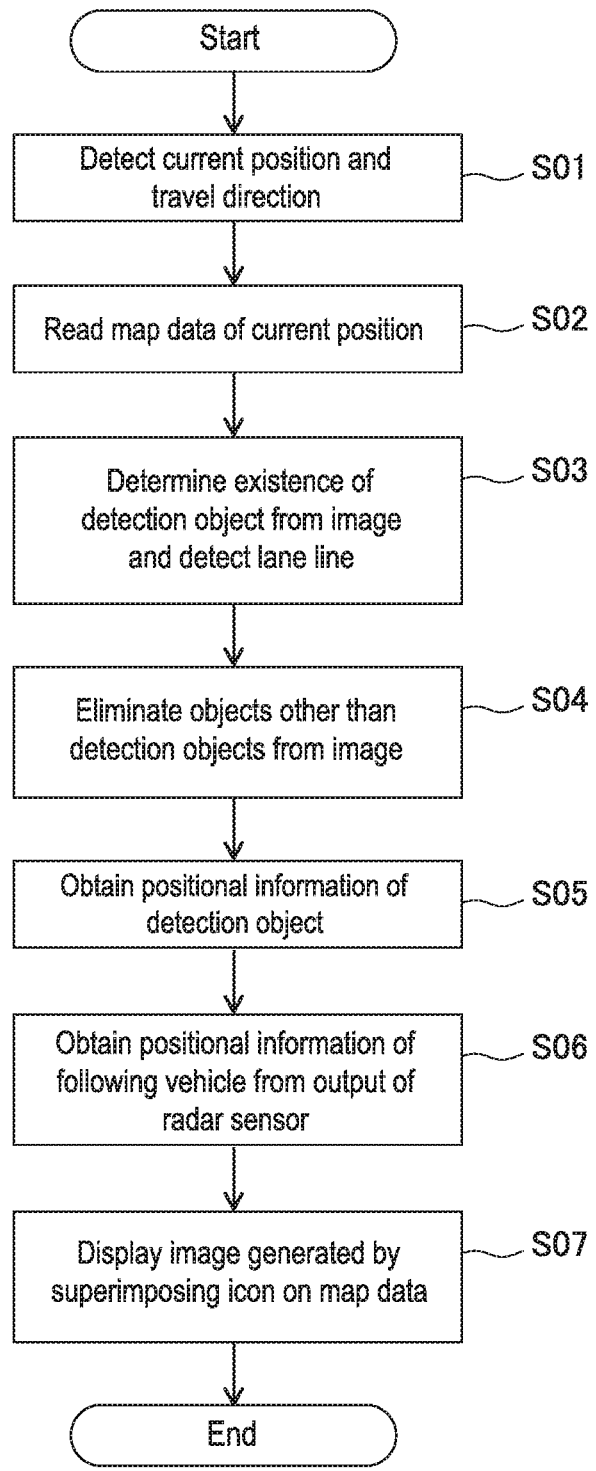

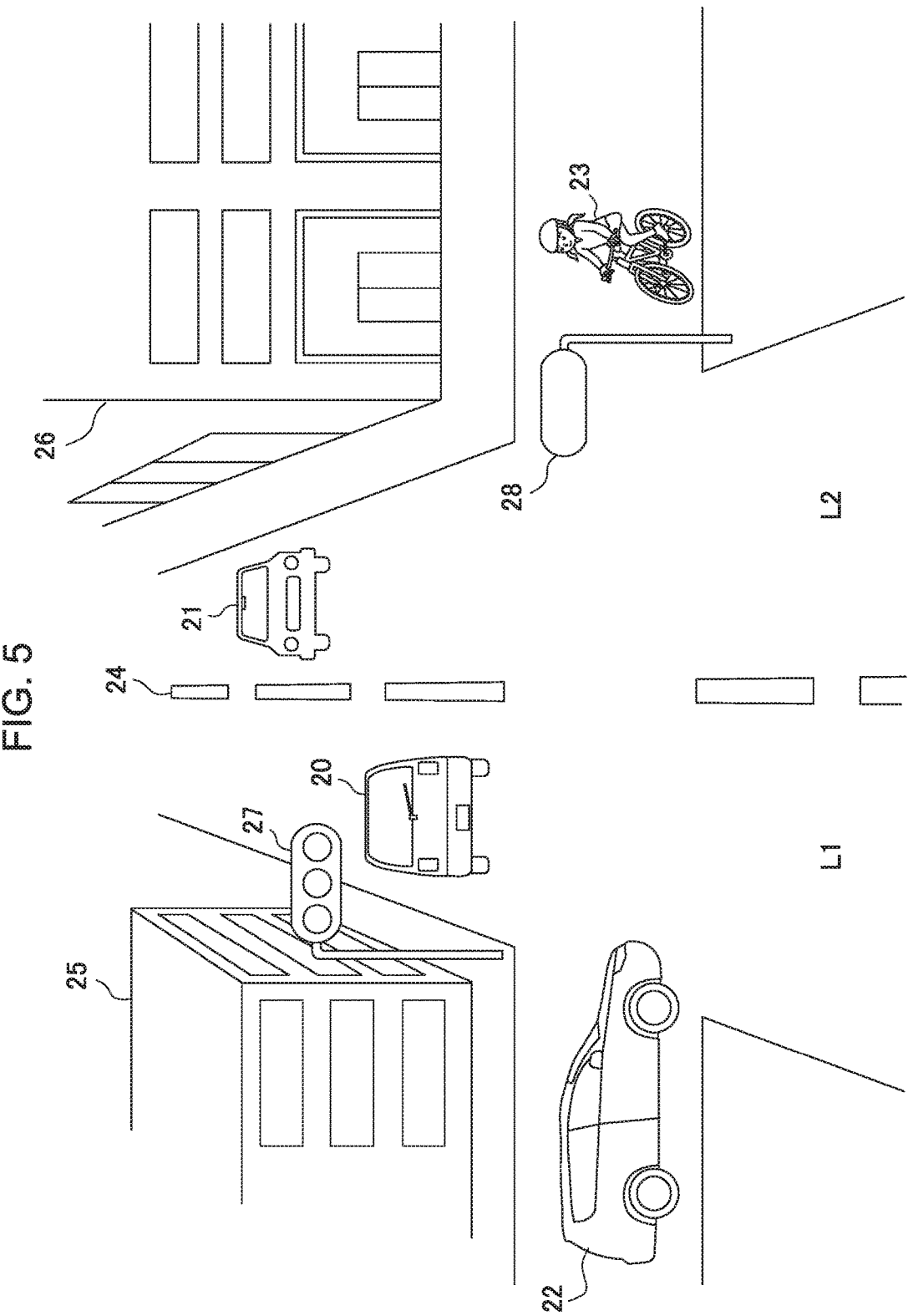

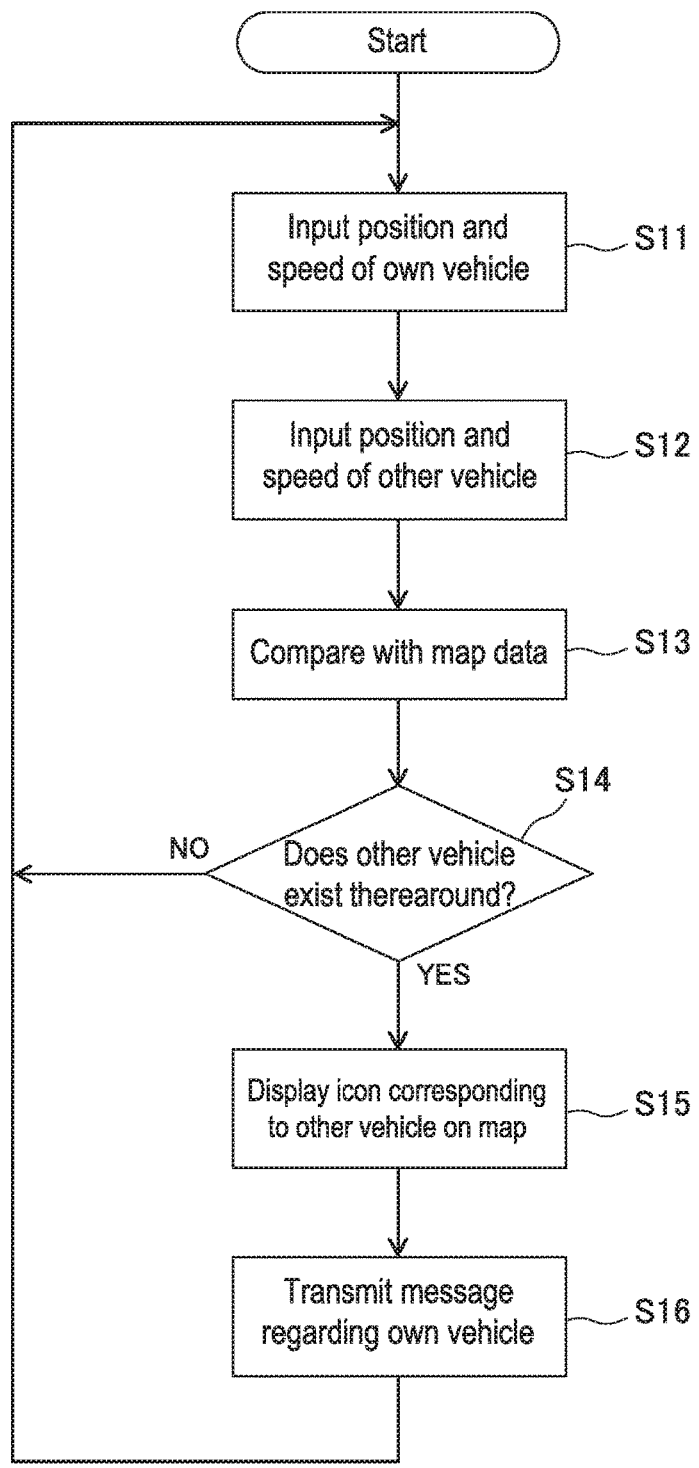

AUTOMOBILE PERIPHERY INFORMATION DISPLAY SYSTEM

RELATED APPLICATIONS

The present application is National Phase of International Application No. PCT/JP2016/064331 filed May 13, 2016, and claims priority from Japanese Application No. 2015-102831, filed May 20, 2015, the disclosure of which is hereby incorporated by reference herein in its entirety.

TECHNICAL FIELD

The present invention relates to an automobile periphery information display system, in a vehicle especially such as an automobile, that displays situations around an own vehicle for an occupant.

BACKGROUND ART

Traditionally, there has been known, as an automobile periphery information display system, a navigation device 2 that displays map information to guide a driver to a destination as being mounted on a vehicle such as an automobile. The navigation device 2 has map information stored in a map database, specifies a current position of the vehicle using GPS information received from a GPS satellite, and reads and displays map to the destination from moment to moment in accordance with travelling of the own vehicle.

Here, the map information is information mainly consisting of roads. When many regions where information amounts are extremely small exist in a screen, the screen becomes inefficient. In view of the above, there has been known a navigation device that superimposes and displays additional information on the display screen of the map in addition to the road information (e.g., see Patent Literature 1 and Patent Literature 2).

CITED LITERATURE

Patent Literature

Patent Literature 1: Japanese Patent Application Laid-Open No. 2001-99666
Patent Literature 2: Japanese Patent Application Laid-Open No. 2001-42026

SUMMARY OF THE INVENTION

In the related art disclosed in the abovementioned patent literatures, each of on-vehicle navigation devices is for providing variation on the display screen of a map to prevent a user from getting bored by displaying information, at a region having less information for displaying a map, information such as animation, a general moving image, a still image, and text data.

Here, such information to be displayed by the navigation devices is additional information to be displayed if there is a region where the information can be displayed. Accordingly, such information is not necessarily required for a user to drive a vehicle or to confirm automated driving situations with an automated driving vehicle.

Recently, research and development of automated driving systems have been in progress for further improving safety of road traffic. With such an automated driving system, an automobile automatically travels while recognizing circumstances therearound. In Japan, automation degree of automated driving systems for vehicles such as automobiles is defined as being classified into four levels, from Level 1 to Level 4. Level 1 is called a safe driving assisting system with which any of accelerating, steering, and braking is performed by an automobile. Level 2 is called a quasi-automated-driving system with which a plurality of operations among accelerating, steering, and braking is performed by an automobile. Level 3 is also called a quasi-automated-driving system with which all of accelerating, steering, and braking are performed by an automobile while those are performed by a driver only in a case of emergency. Level 4 is called a completely automated driving system with which all of accelerating, steering, and braking are performed something other than a driver completely without involvement of the driver. Here, an automated driving system represents Level 2 through Level 4 ("strategic innovation program (SIP) automated driving system research and development plan", Nov. 13, 2014, Cabinet Office, Director-General for Policy Planning, Science Technology and Innovation Department). In the present specification, automated driving is defined basically to include automated driving at all automation degrees, Level 1 to Level 4.

With such an automated driving system, it is desirable for an occupant of an automobile to confirm reliability of an automated driving state by recognizing peripheral situations that have been recognized by the own vehicle.

In view of the above, an object of the present invention is to provide an automobile periphery information display system capable of superimposing and displaying actual situations around an own vehicle on a map.

An automobile periphery information display system according to the present invention includes a sensor device configured to detect situations around an own vehicle, a navigation device configured to specify a current position and a travel direction of the own vehicle and to read map data of a peripheral region including the current position from a map database, an object determination unit configured to detect existence of a detection object based on sensor information detected by the sensor device and to determine a category of the detection object, a position detection unit configured to obtain positional information of the detection object based on the sensor information with the own vehicle being as a reference, an image generation unit configured to generate a map image in which an icon corresponding to the detection object is superimposed on the map data at a position indicated by the positional information regarding the detection object detected by the object determination unit, and a display device configured to display the map image.

In the case that the sensor device includes a camera that takes an image outside the own vehicle, the object determination unit detects existence of the detection object by performing a pattern-matching process on the image taken by the camera. Further, when the camera is a stereo camera, the position detection unit may obtain the positional information of the detection object based on the image taken by the stereo camera.

Further, the object determination unit may detect a lane line being a white line or a yellow line based on luminance information of the image. According to the above, when the object determination unit detects a proceeding vehicle travelling in front of the own vehicle and an oncoming vehicle oncoming toward the own vehicle as the detecting objects, the image generation unit can generate the map image for schematically displaying the lane line on a road of the map data on which the own vehicle travels and displaying each of the icons corresponding to the proceeding vehicle and the oncoming vehicle with lanes distinguished from each other.

Here, when objects other than the detection objects detected from the image are eliminated, the position detection unit can obtain only the positional information of the detection object in a short time.

When the sensor device includes a radar sensor configured of any one of or any combination of a millimeter-wave radar, a micrometer-wave radar, a laser radar, an infrared radiation sensor, and an ultrasonic sensor, the position detection unit can obtain the positional information of the detection object based on information of distance between the own vehicle and the detection object detected by the radar sensor.

Further, the automobile periphery information display system may include a communication device configured to obtain positional information and vehicle category information of another vehicle through vehicle-to-vehicle communication with the other vehicle. In this case, the image generation unit can generate a map image in which an icon corresponding to the vehicle category information is superimposed on the map data at a position corresponding to the positional information. The vehicle-to-vehicle communication may be performed directly between the own vehicle and the other vehicle or indirectly through a communication line by way of a relay center.

According to the automobile periphery information display system of the present invention, peripheral situations that have been recognized by the sensor device of the own vehicle is superimposed and displayed on map data output by the navigation device around a current position of the own vehicle, so that an occupant of the own vehicle can perform a bird's-eye analysis on the peripheral situations.

BRIEF DESCRIPTION OF THE DRAWINGS

FIG. 3 is a flowchart illustrating an operation of the automobile periphery information display system according to the present invention.

FIG. 5 is a view illustrating periphery situations in front of an own vehicle.

FIG. 8 is a flowchart illustrating an operation to display situations of another vehicle obtained through vehicle-to-vehicle communication on map data.

EMBODIMENTS OF THE INVENTION

In the following, embodiments of an automobile periphery information display system of the present invention will be described with reference to the drawings.

Figure 1:
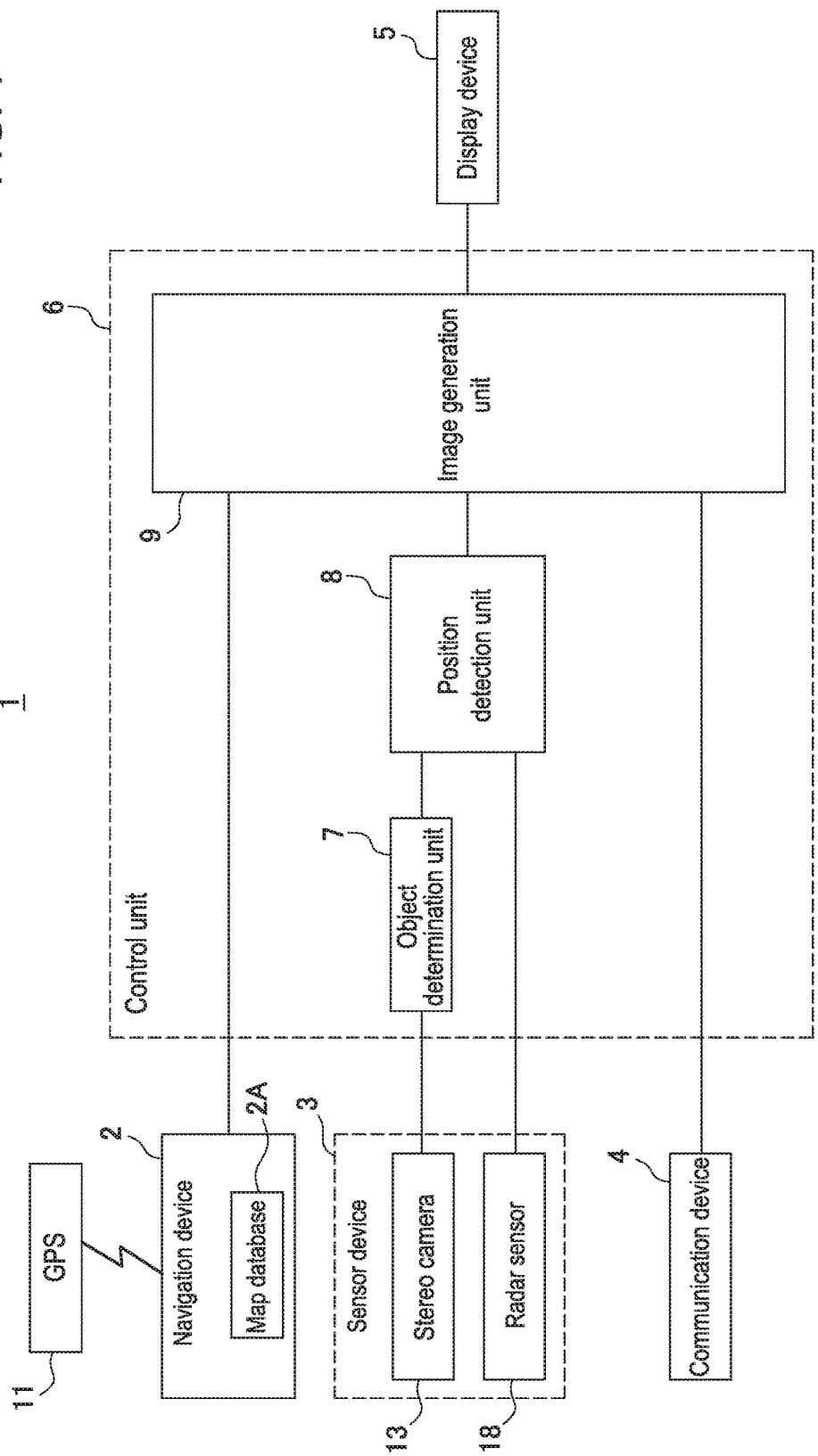
FIG. 1 is a block diagram illustrating an entire configuration of an automobile periphery information display system according to a preferable embodiment of the present invention.

FIG. 1 is a schematic block diagram illustrating an entire configuration of an automobile periphery information display system 1. The automobile periphery information display system 1 includes a navigation device 2, a sensor device 3, a communication device 4, a display device 5, and a control unit 6.

The navigation device 2 mounted on a vehicle specifies a position and a travel direction of the own vehicle based on GPS information received from a global positioning system (GPS) 11. The navigation device 2 includes a map database 2A and reads map data of a region including the specified position of the own vehicle from the map database 2A.

Figure 2:
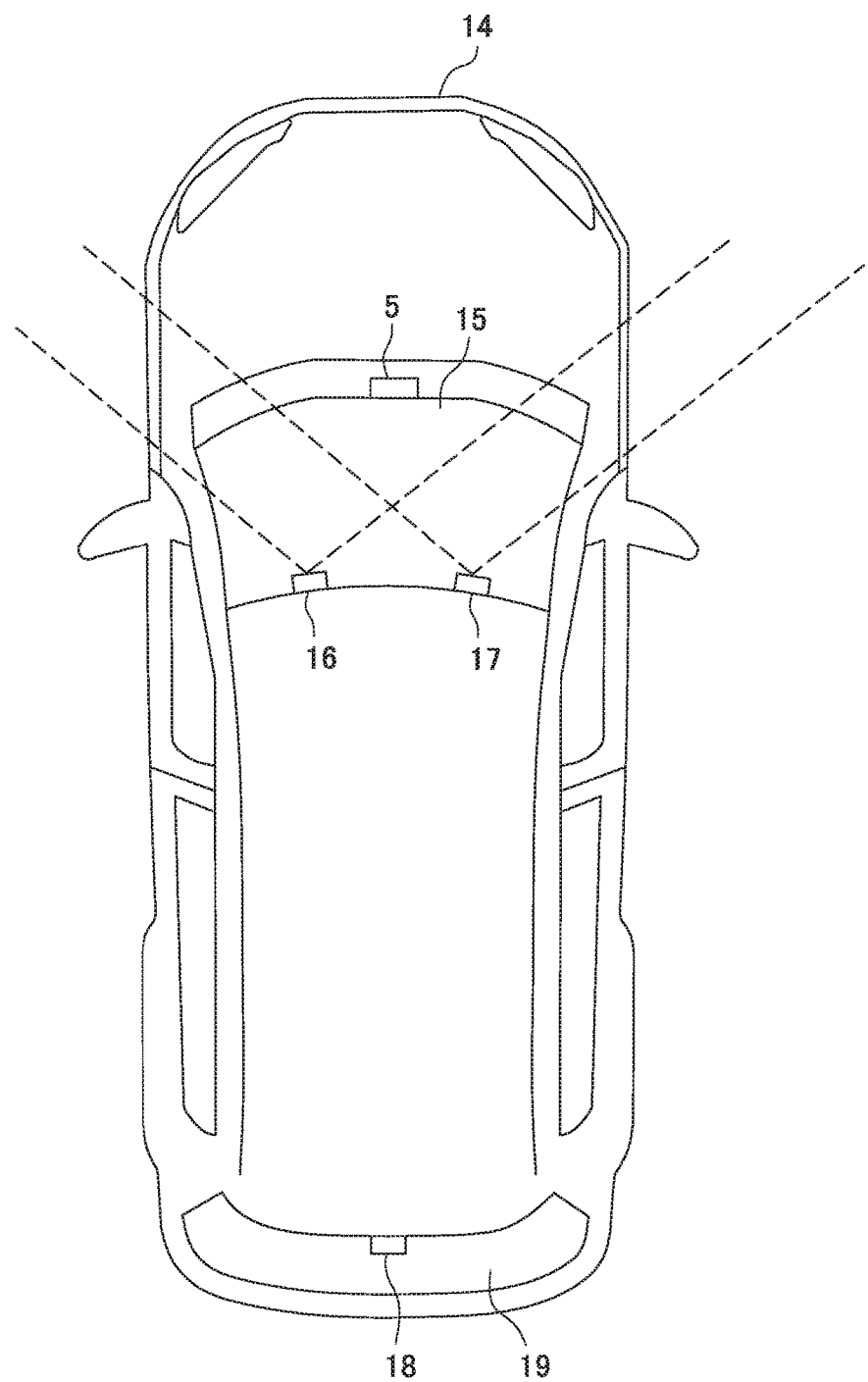
FIG. 2 is a plane view illustrating an example of an arrangement configuration of a sensor device.

The sensor device 3 is for detecting situations around the own vehicle. In this example, as illustrated in FIG. 2, the sensor device 3 includes a stereo camera 13 including a pair of front cameras 16, 17 arranged at a front windshield 15 for capturing front view in a travel direction of an automobile 14, and a radar sensor 18 using millimeter-waves arranged at a rear windshield 19 for detecting a following vehicle to the automobile 14.

Since the sensor device 3 includes the stereo camera 13, a detection object in front of the own vehicle 14 can be recognized in a three-dimensional manner. Further, owing to that an angle of field of the cameras 16, 17 is widened, a detection object rushing out from a side in front of the own vehicle 14 can be reliably detected. Here, a rear camera may be arranged in place of or in addition to the radar sensor 18.

The communication device 4 receives information of a position, a route, and a travel state of another vehicle through communication with the other vehicle travelling, parking, or stopping around the own vehicle. Further, the communication device 4 is capable of receiving infrastructural data such as traffic signal information, traffic regulation information, pedestrian information, and accident vehicle information from and communication devices arranged at traffic lights and arranged beside a road (road-side devices). Such infrastructural information can be obtained as well through radio communication with a road traffic information center through the internet or public broadcasting (not illustrated).

The control unit 6 is structured with a computer that includes a CPU, a ROM, and a RAM. Owing to that the CPU executes a control program stored in the ROM, the CPU functions as an object determination unit 7, a position detection unit 8, and an image generation unit 9 respectively, in addition to controlling the devices described above.

The object determination unit 7 analyzes images transmitted respectively from the cameras 16, 17 of the stereo camera 13 and detects presence of vehicles (a variety of automobiles, motorcycles, bicycles, and the like), pedestrians, and the like (hereinafter, called detection objects) and lanes.

In this case, for detection object detecting, the object determination unit 7 detects an outline of a detection object out of an image while performing a pattern-matching process and determines presence thereof. Here, a pattern data file in which image characteristics of detection objects such as a variety of vehicles and pedestrians are registered in advance is stored in the ROM. Owing to determining whether an image characteristic is included in the image, the object determination unit 7 determines presence of a detection object and a category thereof from images taken by the cameras 16, 17. Further, the object determination unit 7 performs a process to eliminate objects other than the detected objects.

Further, for lane detecting, the object determination unit 7 detects a lane by detecting a lane line 24 being a white line or a yellow line based on luminance information of the images taken by the cameras 16, 17.

The position detection unit 8 obtains a position of a detection object based on the images taken by the cameras 16, 17 from which unnecessary objects are eliminated by the object determination unit 7. In addition, the position detection unit 8 determines a position of a following vehicle based on information of distance against the following vehicle measured by the radar sensor 18.

The image generation unit 9 generates an image indicating situations around the own vehicle based on positional information of a detection object provided from the position detection unit 8. At that time, the image generation unit 9 generates an image indicating peripheral situations with the own vehicle located at the center thereof while superimposing icons being symbolized images of pedestrians and vehicles recognized by the object determination unit 7 on an image of map data provided from the navigation device 2. Here, a plurality of icons corresponding to categories of detection objects are stored in advance in the image generation unit 9.

The display device 5 displays the image generated by the image generation unit 9 as being mounted on a dashboard of the automobile 14 so as to be easily visually recognized by an occupant.

In the following, description will be provided on operations of the automobile periphery information display system 1 with reference to a flowchart of FIG. 3.

Figure 4B:
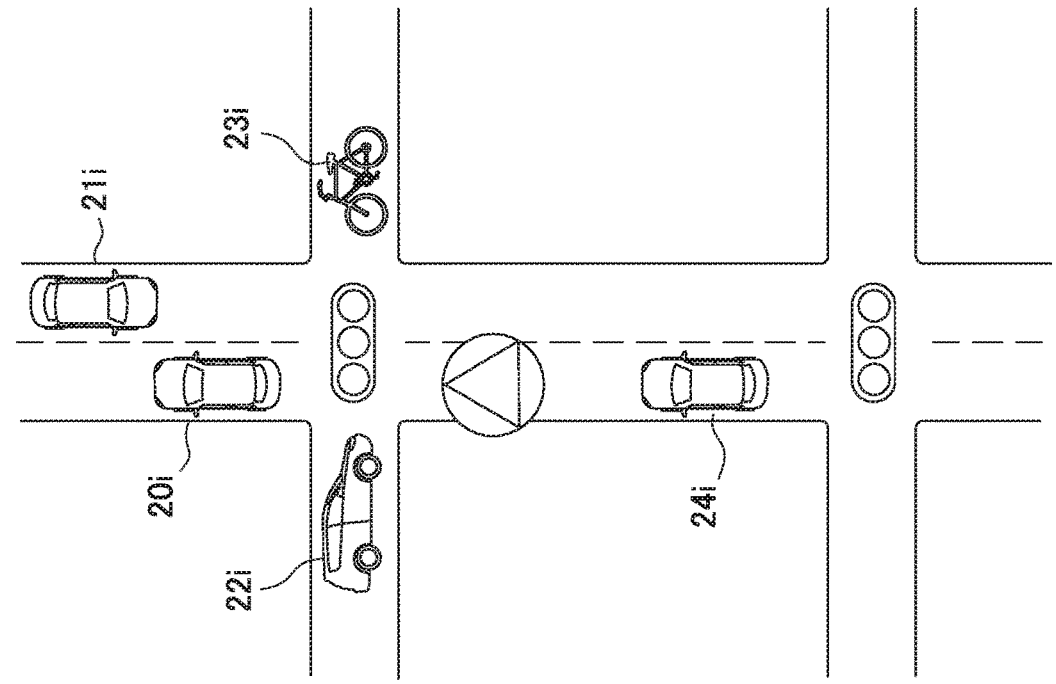
FIG. 4A is a schematic explanatory view of an image of map data displayed by a navigation device and FIG. 4B is an explanatory view of an image including periphery situations superimposed with icons on the image of FIG. 4A.
Figure 4A:
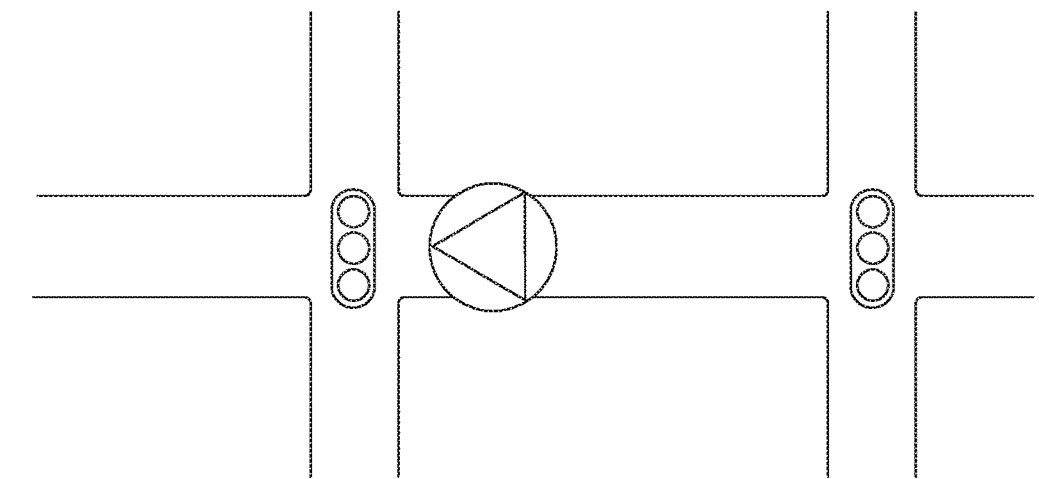

The navigation device 2 specifies a travel direction of the own vehicle while receiving GPS information from the GPS 11, calculating a current position of the own vehicle, and storing a history of the received GPS information (step S01). Then, the navigation device 2 reads map data that includes the current position of the own vehicle from the map database 2A and transfers the map data to the object determination unit 7 (step S02). FIG. 4A illustrates an example of a map image based on the map data with the position and travel direction of the own vehicle indicated by an arrow. Such a map image is a general image displayed by a navigation device.

Then, the cameras 16, 17 take images of outer situations in front of and at the rear of the own vehicle. The object determination unit 7 determines whether a detection object such as a pedestrian or a vehicle exists around the own vehicle through an image recognition process.

FIG. 5 illustrates an example of an image of a view in front of the own vehicle. The object detection unit 7 determines existence of a detection object by performing a pattern-matching process on the respective images taken by the cameras 16, 17 and detects the lane line 24 (step S03). According to the above, the object determination unit 7 detects a proceeding automobile 20 travelling on the same lane L1 as the own vehicle, an oncoming automobile 21 travelling on a right lane L2, an automobile 22 coming from the left side, and a bicycle 23 coming from the right side, respectively.

Next, the object determination unit 7 performs the process to eliminate objects such as buildings 25, 26 and traffic lights 27, 28 other than the detection objects being the automobiles 20, 21, 22 and the bicycle 23 (step S04). Then, the position detection unit 8 obtains, through calculation, positional information on X-Y coordinates from the own vehicle to each of the automobiles 20, 21, 22 and the bicycle 23 based on the images taken by the cameras 16, 17 on which the elimination process has been performed by the object determination unit 7 (step S05).

Meanwhile, the position detection unit 8 obtains, from the sensor device 3, information of distance against a following vehicle measured by the radar sensor 18. The position detection unit 8 calculates, as positional information on the X-Y coordinates, a relative position of the following vehicle at the rear being the detection object with the own vehicle being as a reference (step S06). Here, the detection object detected by the radar sensor 18 is recognized as the following vehicle. However, in the case that a rear camera is arranged in addition to the radar sensor 18 and an image taken by the rear camera is transmitted to the object determination unit 7, detection object at the rear can be recognized for each category.

When category information of the respective detection objects from the object detection unit 7 is provided, the image generation unit 9 selects icons in accordance with the categories thereof. Then, the image generation unit 9 generates and displays a map image while superimposing the selected icons 20*i*, 21*i*, 22*i*, 23*i* on the map data obtained from the navigation device 2 in accordance with the positional information of the respective detection objects provided from the position detection unit 8 (step S07). Here, since the lane line 24 has been detected by the object determination unit 7, the image generated by the image generation unit 9 is displayed while the lane line 24 is displayed at the road on which the own vehicle is travelling to separate the lanes L1, L2 and the proceeding vehicle icon 20*i* and the oncoming vehicle icon 21*i* are displayed as being distinguished from each other, as illustrated in FIG. 4B. Further, in this case, since the following vehicle is detected by the radar sensor 18, the image generation unit 9 displays an icon 24*i* as superimposing the icon 24*i* on the map data in accordance with positional information of the following vehicle.

Regarding icons indicating automobiles, when a bus or a truck is recognized through the pattern-matching process performed by the object detection unit 7, an icon therefor is displayed as being distinguished from that for a passenger car. Alternatively, it is also possible to use a common icon representing all categories of automobiles. Further, when a pedestrian is recognized, an icon obtained by symbolizing a person is to be displayed.

In some cases, map data provided from the navigation device 2 is displayed as a three-dimensional image that includes peripheral buildings and the like. In this case, it is also possible to display actual images taken by the cameras 16, 17 as superimposing the images on the map data.

According to the automobile periphery information display system 1 having the above-mentioned configuration, an occupant on the automobile 14 can recognize, on a display screen of the display device 5, situations around the own vehicle that have been recognized by the sensor device 3. In particular, in the case that the automobile 14 travels with automated driving, an occupant can compare peripheral situations visually recognized by the occupant and peripheral situations recognized by the sensor device 3, so that the automobile periphery information display system 1 serves as an auxiliary system capable of confirming reliability of an automated driving system.

It is also possible that the automobile periphery information display system 1 displays, at the display device 5, peripheral information obtained through vehicle-to-vehicle communication with the communication device 4, in addition to the information obtained from the sensor device 3.

Figure 6:
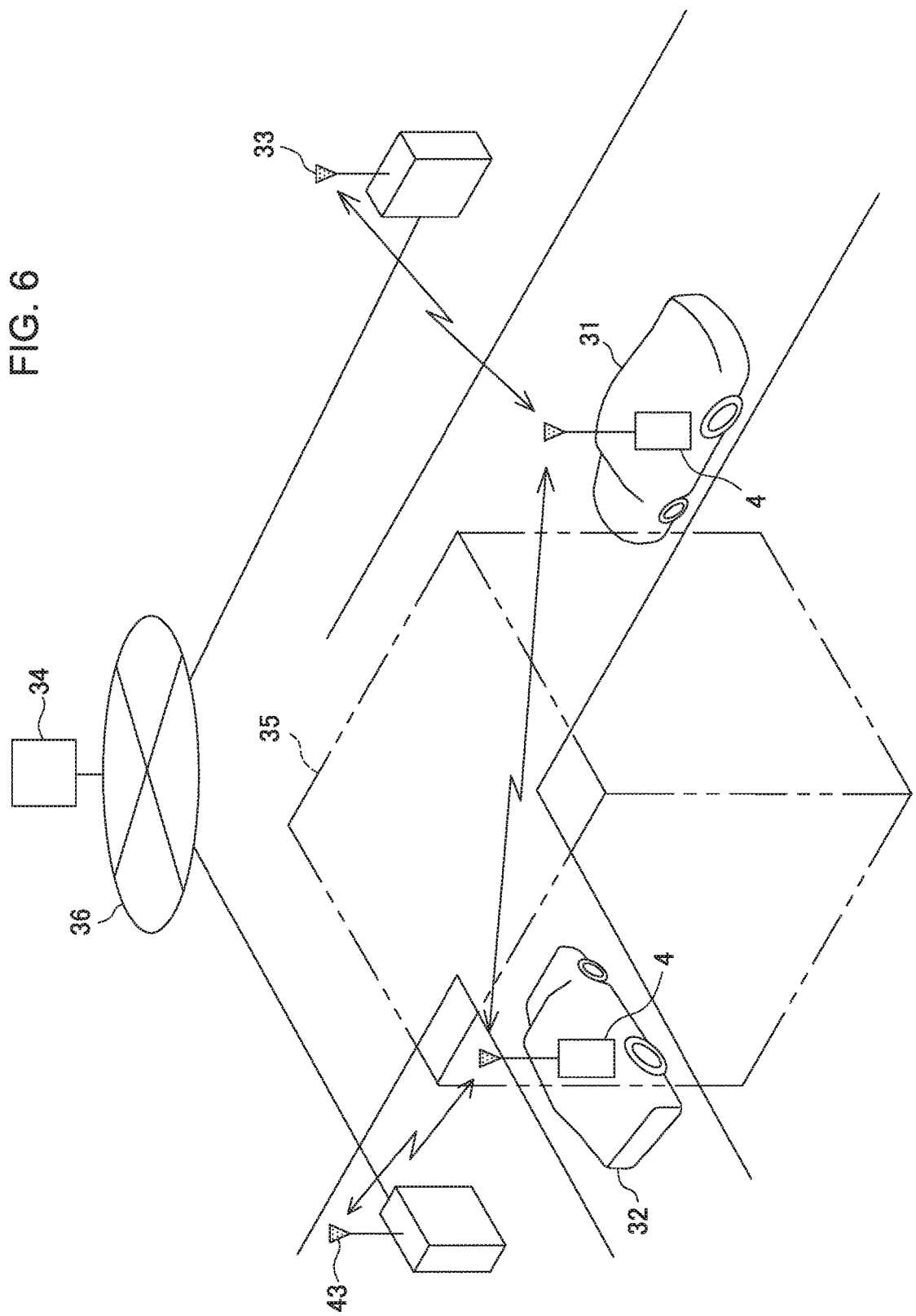
FIG. 6 is a system configuration diagram illustrating an operation of vehicle-to-vehicle communication.

Here, description will be provided below on vehicle-to-vehicle communication. As illustrated in FIG. 6, message data indicating a position and a state of an own vehicle is transmitted and received through unidirectional broadcast communication between respective communication devices 4 of the vehicles 31, 32, In this case, the communication may be performed directly between the vehicles 31, 32. Alternatively, the communication may be performed indirectly through a communication line 36 such as the internet from an antenna 33 or a communication chip (not illustrated) installed beside a road by way of a relay center 34. In the case illustrated in FIG. 6, although the vehicles 31, 32 travelling toward the same junction cannot be visually recognized from each other with a view therebetween blocked by a building 35, both the vehicles 31, 32 transmits a position, a speed, and the like of the own vehicle to each other through the communication. Thus, safe driving is supported as preventing a collision accident.

Figure 7:
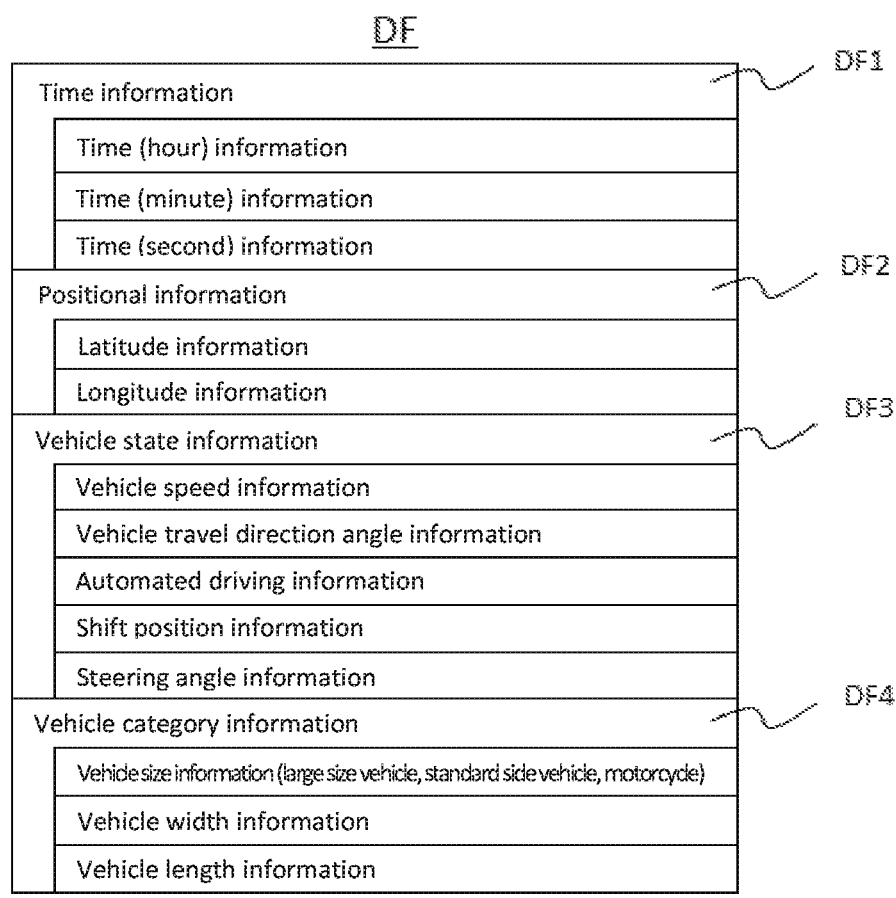
FIG. 7 is schematic explanatory view illustrating a configuration of a data frame of a message transmitted through vehicle-to-vehicle communication.

FIG. 7 schematically illustrates a structural example of a data frame DF of a message to be transmitted and received through vehicle-to-vehicle communication. The structural example includes a time information data frame DF1 in which data elements being hours, minutes, and seconds are to be written, a positional information data frame DF2 in which data elements being latitude and longitude obtained from GPS or the like are to be written, a vehicle state information data frame DF3 in which data elements being speed information, vehicle travel direction angle information, automated driving information, shift position information, and steering angle information are to be written, and vehicle category information data frame DF4 in which data elements being vehicle size information (a large size vehicle, a standard size vehicle, a motorcycle, or the like), vehicle width information, and vehicle length information are to be written.

In the following, description will be provided on operations for displaying information obtained through vehicle-to-vehicle communication with reference to a flowchart of FIG. 8. First, the communication device 4 inputs a position and a speed of the own vehicle obtained by the navigation device 2 (step S11). Further, a position and a speed of another vehicle are obtained through the communication device 4 (step S12). In this case, as described above, a message including, at data frames, positional information, vehicle category information, and vehicle state information such as a speed and a travel direction angle is output from another vehicle on which a communication device that is the same as or compatible to the communication device 4 is mounted.

Then, the image generation unit 9 compares the message with the map data provided from the navigation device 2 (step S13) and determines whether another vehicle exists around the own vehicle based on the check result (step S14). When another vehicle capable of communication therewith exists around the own vehicle (YES in step S14), the image generation unit 9 selects an icon corresponding to a category of the other vehicle based on vehicle category information and generates and displays a map image while superimposing the selected icon in accordance with positional information of the received information (step S15). Meanwhile, the communication device 4 transmits a message including time information, positional information, vehicle state information, and vehicle category information of the own vehicle (step S16).

Owing to performing vehicle-to-vehicle communication as described above, even when the automobile 22 in FIG. 5 cannot be visually recognized behind a building, the image generation unit 9 can display the icon on the map data as detecting existence of the automobile 22 as long as vehicle-to-vehicle communication is available. Further, besides vehicle-to-vehicle communication, information regarding an accident vehicle, roadwork, and the like can be obtained through radio communication with a road traffic information center through the internet or public broadcasting and icons indicating such situations can be displayed as well on the map data.

In the above, description is provided in detail on preferable embodiments of the present invention. Here, not limited thereto, the present invention may be actualized with a variety of modifications within the technical scope thereof. For example, it is also possible, for widening a detection view at the rear of an automobile, to arrange a pair of cameras (stereo camera) or radar sensors on both sides of the rear window shield 19. Further, not limited to the rear window shield 19, a camera or a radar sensor may be arranged at each of a pair of door mirrors.

EXPLANATION OF REFERENCES

1 Automobile periphery information display system
2 Navigation device
3 Sensor device
4 Communication device
5 Display device
7 Object determination unit
8 Position detection unit
9 Image generation unit
13 Stereo camera
18 Radar sensor
20i, 21i, 22i, 23i, 24i Icon
24 Lane line
34 Relay center
36 Communication line

The invention claimed is:

1. An automobile periphery information display system, comprising:
   a sensor device configured to detect situations around an own vehicle;
   a navigation device configured to specify a current position and a travel direction of the own vehicle and to read map data of a peripheral region including the current position from a map database;
   an object determination unit configured to detect existence of a detection object based on sensor information detected by the sensor device and to determine a category of the detection object;
   a position detection unit configured to obtain positional information of the detection object based on the sensor information with the own vehicle being as a reference;
   an image generation unit configured to generate a map image in which an icon corresponding to the detection object is superimposed on the map data at a position indicated by the positional information regarding the detection object detected by the object determination unit;
   a display device configured to display the map image; and
   a communication device configured to obtain positional information and vehicle category information of another vehicle through vehicle-to-vehicle communication with the other vehicle,
   wherein, when the communication device receives the positional information and the vehicle category information, the image generation unit generates the map image in which the icon corresponding to the vehicle category information is superimposed on the map data at the position corresponding to the positional information.

2. The automobile periphery information display system according to claim 1, wherein the sensor device includes a camera that takes an image outside the own vehicle, and the object determination unit detects existence of the detection object by performing a pattern-matching process on the image taken by the camera.

3. The automobile periphery information display system according to claim 2, wherein the camera is a stereo camera, and the position detection unit obtains the positional information of the detection object based on the image taken by the stereo camera.

4. The automobile periphery information display system according to claim 2, wherein the object determination unit detects a lane line based on luminance information of the image.

5. The automobile periphery information display system according to claim 4, wherein the object determination unit detects, as the detection objects, a proceeding vehicle travelling in front of the own vehicle and an oncoming vehicle, the image generation unit generates the map image for schematically displaying the lane line on a road of the map data on which the own vehicle travels and displaying each of the icons corresponding to the proceeding vehicle and the oncoming vehicle with lanes distinguished from each other.

6. The automobile periphery information display system according to claim 2, wherein the object determination unit eliminates objects other than the detection objects detected from the image, and the position detection unit obtains the positional information of the detection object based on the image on which eliminating has been performed.

7. The automobile periphery information display system according to claim 1, wherein the sensor device includes a radar sensor configured of any one of or any combination of a millimeter-wave radar, a micrometer-wave radar, a laser radar, an infrared radiation sensor, and an ultrasonic sensor, and the position detection unit obtains the positional information of the detection object based on information of distance between the own vehicle and the detection object detected by the radar sensor.

8. The automobile periphery information display system according to claim 1, wherein the image generation unit generates the map image in which the icon indicating information on an accident vehicle and roadwork obtained by the communication device is superimposed on the map data.

9. The automobile periphery information display system according to claim 8, wherein the vehicle-to-vehicle communication is performed directly between the own vehicle and the other vehicle or indirectly through a communication line by way of a relay center.

\* \* \* \* \*